diffusion through the structure of the gypsum. In addition, these cracks allow the penetration of heat and oxygen into the depths of the gypsum to allow oxidation of the saccharide. Where cracks develop, dehydration progresses along a front which proceeds from the exposed surface of the material towards the surface that is most remote from the source of heat. It has been found that a relatively high concentration of fine fibers distributed uniformly throughout the hydraulic cement, and particularly gypsum, will prevent cracks from opening up to thereby retard the escape of autogenously produced water vapor as well as oxidation of the saccharide. By a proper physical arrangement of the fibrous reinforcing in the hydraulic cement, and particularly gypsum, the saccharide is entombed in a manner causing the products of pyrolysis of the saccharide to be retained.

United States Patent Office 3,459,571
Patented Aug. 5, 1969

3,459,571
REINFORCED HYDRAULIC CEMENTS AND CASTS THEREFROM
Richard F. Shannon, Lancaster, Ohio, assignor to Owens-Corning Fiberglas Corporation, a corporation of Delaware
No Drawing. Filed Jan. 10, 1966, Ser. No. 519,462
Int. Cl. C04b 11/14; B32b 17/06; C09d 3/20
U.S. Cl. 106—114                                 8 Claims

ABSTRACT OF THE DISCLOSURE

A reinforced gypsum containing glass fibers surrounded by a non water soluble starch capable of undergoing pyrolysis to provide a cooling action which preserves the fibers when the gypsum material is subjected to fire.

---

The present invention relates to reinforced hydraulic cements having water of crystallization and casts therefrom; and more particularly to reinforced gypsum and wallboards thereof.

Materials which set by water of crystallization have many uses. One of the materials commonly used is gypsum and one large usage of hydrated gypsum is in the manufacture of wallboards. Gypsum wallboards of the type wherein a plastic mix of water and dehydrated gypsum is caused to set between a pair of outer skins of paper and the like, are used extensively for the surfacing of the ceiling and walls of single story dwellings; and the art has long desired to increase the fire-resistance, or fire rating of this type of board, so that it can be used for the ceiling and wall surfacing of multistory buildings.

The principal object of the present invention is the provision of new and improved means for increasing the fire-resistance of materials which set by means of water of crystallization, and particularly gypsum.

A more specific object is the provision of new and improved wallboard which will have a greater resistance to fire than do prior art gypsum wallboards.

Further objects and advantages of the invention will become apparent to those skilled in the art to which the invention relates from the following disclosure of the new and improved principles that are involved in the invention, as well as the description of materials embodying the invention.

According to the present invention, it has been discovered that a unique cooperation exists between a hydraulic cement which sets by water of crystallization; inorganic fibers, and particularly siliceous fibers, which reinforce the gypsum; and a saccharide incorporated in the mixture of gypsum and fibrous reinforcing. This cooperation has not been known prior to this inventor's discovery thereof.

It has been discovered that a saccharide which when incorporated in hydraulic cement will undergo pyrolysis when the mixture is heated, as by a fire in a dwelling. A saccharide in addition to carbon includes hydrogen and oxygen in a ratio to form water of substantially all of the available hydrogen, and this water is liberated to the surrounding gypsum in the form of a water vapor. Under proper conditions, as will later be explained, this water vapor can be retained by the gypsum even in its dehydrated state so long as cracks do not develop.

It has been discovered that fibrous reinforcing plays a very important role in determining whether or not the above phenomenon takes place in a mixture of a hydraulic cement and a saccharide, and to what extent it takes place. Hydraulic cements and particularly gypsum are prone to develop cracks when heated, and these cracks will vent any autogenously produced water vapor and preclude its In order that the fibrous reinforcing will properly entomb the saccharide, it is necessary that substantially all of the fibers be completely and uniformly dispersed throughout the gypsum and not be present as bundles or strands of fibers in which the gypsum does not completely surround each of the fibers of the bundle. Bundles of fibers allow leakage paths for the products of pyrolysis to develop between the fibers. In addition, upon pyrolysis any organic binder positioned between the fibers will, of course, be destroyed to weaken the structure and allow a crack to develop. Since the fibers and bundles are randomly oriented, these cracks will usually extend to the exposed surface and thereby counteract the useful effect of the saccharide. It has been discovered that, for the saccharide to produce the above-described phenomenon, each of the fibers of the reinforcing should be surrounded by gypsum in order that the strength of the fiber will be transferred to the gypsum and preserve its crystalline structure. Because fibrous reinforcing and particularly siliceous fibers such as glass have such high strength relative to the crystalline structure of the gypsum, these fibers should have a high $L/R$ ratio; and for those instances wherein the fibers are not longer than approximately one half an inch, as is usually the case in relatively thin reinforced sections, the fibers should preferably be as fine as possible and preferably less than approximately 0.00040 inch. Under such circumstances the full strength of large diameter fibers cannot be utilized because of insufficient area to transfer force from the cement to the fiber. Because bundles of fibers cannot be tolerated, and because it is imperative that all regions of the gypsum be uniformly reinforced, the degree to which short bundles of fibers are separated into individual fibers and dispersed throughout the cement becomes of the utmost importance and can control whether or not the above-described effect of the saccharide is produced.

A still further phenomenon is produced by the pyrolysis of a saccharide entombed within a hydraulic cement. One of the first stages of pyrolysis of a saccharide is the liberation of water vapor and the formation of carbon. Where the water vapor is retained in contact with the carbon at elevated temperatures, an endothermic reaction can proceed between the carbon and the water vapor to produce carbon monoxide and hydrogen. This reaction is highly endothermic, and the lower molecular weight gases produced have a very low thermoconductivity. When the reaction is confined to the vicinity of the fibers both a cooling effect and an insulating effect on the fibers is produced. Here again it will be understood that if the fibers do not properly reinforce the cement, and cracks develop, not only will the water vapor be vented, but oxygen will be allowed to enter the structure to prevent the above-described endothermic reaction from taking place.

It appears that small fibers uniformly dispersed throughout the gypsum will hold the gypsum intact even when it has been dehydrated. It further appears that the calcium sulfate formed by the dehydration of the gypsum will reform its crystalline structure at a temperature above the normal softening point of the glass. The above-described phenomenon involving the pyrolysis of the saccharide is a very important and necessary one to in turn preserve the integrity of the fibers during the time that the dehydrated gypsum which they support is at a temperature above the softening point of the fibers. Once the calcium sulfate has recrystallized, it becomes a hard fire-resistant material which can thereafter withstand exposure to the fire almost indefinitely. The degree to which the fibers can hold the material in place during this transition is, therefore, a controlling one; and in order that this can take place, it is necessary that the saccharide be confined to the vicinity of the fiber.

A still further phenomenon occurs when a saccharide is mixed with water and a hydraulic cement to form a cast. Most saccharides and particularly those which have heretofore been applied to fibers, and particularly glass fibers at forming, are highly water soluble, and this solubility has been necessary in order that the saccharides could be successfully applied to the glass fibers by previously used methods and procedures. It will be understood that glass fibers are easily broken by the rubbing of one fiber upon the other, and that this is an inherent weakness which must in all instances be prevented. Because of their high strength, siliceous fibers and particularly glass fibers have replaced substantially all other types of reinforcing for gypsum, and particularly gypsum wallboard, and is the universally used reinforcing media for such materials.

One type of glass fibers which has been used heretofore has been textile fibers. Glass fibers of the same composition and size are adapted for different end uses by changing the coating that is applied to the fibers. A textile fiber must have a coating which will withstand the use which the fiber will experience as a textile. This coating must separate the individual fibers. Textile coatings are not burnt off or removed from the fibers, whereas temporary coatings are removed during an intermediate stage of fiber manufacture from all other fibers of the textile, and this coating must be permanent throughout the use of the textile. The type of coating that is provided on the glass fiber, therefore, determines whether or not it is a textile fiber or can be woven into a fabric. Various hydrocarbons have been used to some degree as a coating of textile fibers, but the one most universally used has been polyvinyl acetate. Polyvinyl acetate forms a tough film which will withstand abrasion and flexing such as is encountered in a woven fabric, and still is sufficiently water soluble that it will substantially completely coat the fibers at forming at speeds in excess of 10,000 feet per minute.

Glass fibers are also made with a temporary binder or coating which will protect the individual filaments while they are being drawn together into a strand and the strand is coiled into a package. These temporary binders will also protect the fibers during subsequent twisting operations, but are removed before final use of the fibers. Because of the temporary nature of these films, the thus coated fibers can be used in many types of products. Because fibers having a temporary binder can be employed in any end use by the removal of the temporary coating and the application of a permanent coating uniquely suited for the particular end use, these fibers are considered to be "universal" fibers. The coating which has been universally used for a "universal" fiber has been a solubilized or derivatized starch in order that the starch will quickly flow around each of the filaments and form a film. These materials pass through a stage known as a gelatinized stage. The most used starch has been a dextrinized starch because of its low cost and availability, and in addition, ethylated starches have been used to some degree.

In order that hydraulic cements and particularly gypsum can be cast, it is necessary to use an amount of water above and beyond that required for water of crystallization in order that it will have the proper consistency. Upon drying of the cast material, this water moves to the surface to leave voids in the grain boundaries of the hydrated material. According to the invention, it has been found that polyvinyl acetate and all of the starch materials which have been applied to the fibers heretofore from a water solution will become dissolved to some extent by the water that is mixed with the dehydrated materials. As this water is transferred into water of crystallization, the dissolved materials remain with the excess water at the grain boundaries; and during the subsequent drying of these materials, the soluble film-forming materials migrate to the outer surfaces of the cast with the water. All of the glass fibers which have been used to reinforce hydraulic cements heretofore, therefore, have, unbeknown to the art, suffered from this phenomenon, whereby the film-forming material has been removed from the fibers and caused to move through the cast material towards the exposed surfaces of the cast with the excess water.

According to the invention, it has been discovered that it is imperative that the saccharide material remain in the vicinity of the fibers. This has not been known heretofore. In experiments which have been performed, saccharides have been uniformly mixed with dehydrated gypsum and sufficient water has been added to form a cast. In all instances no improvement has been found in the fire-resistance of the cast so made over a gypsum which did not include a saccharide material. It was also found that the use of finely divided materials having a particle size substantially larger than those which form colloids actually reduce the fire-resistance of the cast. Wood sawdust, for example, although providing some green strength, burns to leave large voids which actually weaken the structure when the cast is exposed to high temperature. Similarly wheat flour will produce voids which decrease the fire-resistance of the cast material. Sugar, on the other hand, can be used in a manner which does not produce these voids and is, therefore, better than the larger particulate material; but because of its solubility it "migrates."

According to the invention it has been found that when insoluble polysaccharides are incorporated into the fibrous reinforced hydraulic cement in a manner which will allow the cement to flow around each of the fibers and bond thereto with the polysaccharide material positioned adjacent the fibers, a vastly improved resistance to fire is had by the cast. If the polysaccharide migrates away from the surface of the fiber to become uniformly distributed throughout the gypsum, an appreciable reduction in the fire-resistance results.

One structure embodying the principles of the present invention was produced by coating glass fibers at forming with a partially cooked underivatized naturally occurring starch material. The starch material was previously extracted from vegetable matter in a manner leaving the naturally occurring cells or granules intact. The cooking was done under conditions wherein a sizable percentage of the granules were not completely burst (approximately 25%). The completely burst granules had disintegrated to form what is known as solubilized starch. The material which was solubilized does not form a true solution because the particle size is generally that of a colloid and, therefore, upon drying forms a type of gel that encases and retains the much larger unsolubilized unburst as well as partially burst starch granules. The synergistic effect of the present invention is obtained with fibers having a coating of more than approximately ½% by weight of the above-described material. Preferably, however, more than approximately 1% should be used to insure uniform, good results.

This material was applied to individual glass fibers at forming from a water solution and the thus coated filaments were brought together into a strand comprising approximately 408 filaments. The fibers were of E glass and had a diameter ranging from approximately 0.00025 inch to approximately 0.00039 inch. The strand was coiled into a package and dried. The strand so produced comprised a bundle of fibers each of which was coated with a film having only partially burst granules dispersed throughout and which protruded from the surface of the individual fibers to space the individual fibers apart. The total amount of starch on the fibers (both solubilized and unsolubilized) was approximately 1.5% of the total weight of the thus coated fibers. Strands of the thus produced fibers were chopped into approximately ½ inch lengths and mixed with calcium sulfate hemihydrate in an amount comprising 0.25% of the total dry materials. An amount of water comprising approximately 40% by weight of the dry materials was added, and a uniform, creamy slurry formed by thorough mixing. The slurry was poured into 12 inch by 6 inch by ½ inch thick samples which were dried overnight at 100° F.

The samples were exposed to a flame having a temperature of from 2100 to 2200° F. for 20 minutes, and it was found that glass fibers remained throughout the samples. One half inch thick gypsum wallboard prepared from the same material but using a foaming operation to provide a density of approximately 50 pounds per cubic foot gave a fire rating of more than one hour.

By way of contrast and not according to the invention, 12 inch by 6 inch by one half inch samples were similarly prepared using glass fibers having 1.5% by weight of a polyvinyl acetate coating. When fired in a similar manner no evidence of glass fibers remained in the region beneath the surface exposed to the flame. Similarly, samples that were made from fibers coated with dextrinized starch were burned out in the region beneath the surface exposed to the flame. One half inch thick gypsum wallboards prepared in the same manner as the wallboard above-described but utilizing .25% by weight of of the polyvinyl acetate coated fibers above-described, only had a fire rating of approximately 45 minutes. Similarly, one half inch thick gypsum wallboard prepared in the same manner as above-described excepting that the glass fibers were coated with a dextrinized starch instead of the uncompletely burst and insoluble starch material above-described had a fire rating of 45 minutes.

Examination of the unburned areas of the samples having the fibers coated with uncompletely burst starch granules showed that the filaments were completely and uniformly dispersed throughout the sample and that no rods or filaments adhering together were present. By way of contrast the samples prepared from the fibers coated with polyvinyl acetate and those prepared from fibers coated with dextrinized starch had a sizeable amount of rods therein of filaments which were still adhered together.

A greater degree of dispersibility of fibers or filaments coated with unburst starch material is evident during the chopping operation wherein the strands are cut up into short sections. During this operation substantially all of the strands that are coated with the uncompletely burst starch fly apart unless they are wetted, whereas little, if any, of those coated with dextrinized starch and/or polyvinyl acetate fly apart. Since an appreciable amount of mechanical mixing with the gypsum takes place, it is evident that the uncompletely burst granules which separate the fibers greatly aid in the disruption of the strands to give uniform dispersion of the individual fibers throughout the cast material.

While any type of naturally occurring starch can be used to provide the uncompletely burst starch granules that are used in the preferred method of providing the polysaccharide around the fibers in the cast material, the most preferred fiber is one wherein a high amylose starch is utilized. Normal starches contain approximately 25% of amylose and 75% of amylopectin. It is possible, however, to obtain some naturally occurring starches having amylose to amylopectin ratios of more than 45 to 55, and these materials are preferred because the portion which goes into solution and which holds the uncompletely burst granules together will thereby have a higher amylose content. Amylose forms a gel which is firmer and more migration resistant than is amylopectin, and the coated fibers, therefore, carry a polysaccharide to the cast material in a form which is more migration-resistant.

Obviously, the migration-resistant polysaccharide can be produced in many ways as, for example, by cooking one type of starch completely and then adding uncompletely burst starch granules to the completely solubilized starch. It is also possible to coat the fibers with a sugar solution containing uncompletely burst starch granules or other insoluble polysaccharide material of approximately the same particle size as the unburst granules. Suitable heat treatments may be used in some instances to increase the flexibility of sugar containing coatings.

It will also be apparent that the coated fibers need not be produced in the form of a strand or bundle which is later broken apart, but can be in the form of mats of generally parallel fibers which are coated with the desired material and chopped into the appropriate length. In addition, it will be apparent that suitably coated mat or wool materials such as glass wool or rock wool can be used provided the fiber diameter is of the appropriate thickness. These fibers will have the advantage that they are not entirely straight, and may in some instances provide better anchorage in the hydraulic cements. It will also be apparent that while much of the above discussion is centered about the use of gypsum as the hydraulic cement, that the principles of the present invention are equally applicable to any type of hydraulic cement where water of crystallization is driven off during exposure to intense heat. It will further be apparent that various types of glass fibers can be used, and that higher melting glasses such as S glass will be preferable in some instances. In addition, asbestos fibers coated with nonmigrating polysaccharides, and fibers formed of naturally occurring minerals, as, for example, those drawn from molten igneous material, and coated with nonmigrating polysaccharides can be used. The fiber reinforcing which is used, however, should be substantially entirely of fibers coated with the nonmigrating, dispersible material above-referred to; since even a small amount of bundles of fibers occurring in gypsum or a small volume of gypsum in which the fibers have burned out will cause a failure to develop in wallboard.

It will also be apparent that when fibers coated with a combination of uncompletely burst granules held together by a solubilized material are used in a wet plastic mix, that the solubilized material will become "solubilized" to some degree by the water to free the insoluble particles and allow the hydraulic cement to flow around the fibers. It has further been found that the insoluble uncompletely burst granules help to prevent the migration of the solubilized polysachharide away from the fibers and thereby helps to retain even the solubilized material in the vicinity of the fibers.

A brief review of the development of the art to which the invention relates, as evidenced by the major patents in the art, clearly shows that the art was not aware of the present invention, and that it did not have knowledge which would make it obvious.

The first of the important patents in this area is the Croce Patent, 2,526,066. The principal teaching of this patent is the swelling of a vermiculite addition to gypsum to offest the shrinkage of the gypsum during heating. The patent states that 1 percent bonding starch is used. The bonding starch is a soluble starch and as shown above will not improve the fire-resistance of the board, nor would it cause one skilled in the art to become aware of any of the principles above-described and which are necessary in providing the advance of the present invention.

The next significant patent to issue is the Croce-Shuttleworth patent, 2,681,863. This patent describes both general purpose glass fibers, and textile glass fibers, and discloses that an advantage is had by using textile glass fibers as a reinforcing for gypsum in lieu of other types of fibers. Nowhere in the patent is there a disclosure of any advantage of starch coated fibers over a resin coated fiber, such as polyvinyl acetate coated fibers, and since the Croce-Shuttleworth development and prior to the present invention, the fibers which have been universally used for the reinforcing of fire-rated gypsum wallboard have been polyvinyl acetate coated glass fibers.

The next major development in the art was that disclosed by the Croce-Shuttleworth Patent 2,744,022 which discloses an advantage of the combination of unexpanded vermiculite and textile glass fibers. This development occurred at the time that the polyvinyl acetate coated fibers were the universally used fiber for reinforcing fire-rated gypsum wallboard, and the polyvinyl acetate coated fiber has continued to be the universally used fiber until the present invention. The present invention was not known or obvious therefore to those skilled in the art.

Another significant patent in this area is the Marzocchi et al. Patent 3,062,670.

While the invention has been explained in considerable detail and several preferred materials and procedures have been disclosed for providing the structure of the invention, I do not wish to be limited to the specific materials disclosed and it is my intention to cover hereby all novel adaptations, modifications and arrangements of the invention which come within the practice of those skilled in the art and which fall within the scope of the following claims.

What I claim is:

1. A cast resistant to fire and mechanical shock and consisting essentially of gypsum set by water of crystallization, and substantially uniformly reinforced by siliceous fibers that are surrounded by more than approximately ½% by weight of the fibers of a partially cooked underivatized starch containing about 25% unburst starch granules, said material when at a 50 pound per cubic foot density and ½ inch thick having an A.S.T.M. fire resistant rating of more than 1 hour.

2. The cast of claim 1 wherein said fibers are glass fibers.

3. The cast of claim 1 wherein the starch comprises more than approximately 45% amylose.

4. The cast of claim 3 wherein said starch comprises uncompletely cooked and unburst starch granules.

5. A fire-resistant wallboard comprising a body member cast between two paper sheets, said body member comprising set gypsum plaster as the major ingredient, and also containing a substantially uniformly and completely dispersed reinforcing ingredient consisting essentially of glass fibers coated with more than approximately ½% by weight of the fibers of a partially cooked underivatized starch containing about 25% unburst starch granules, said material when at a 50 pound per cubic foot density and ½ inch thick having an A.S.T.M. fire resistant rating of more than 1 hour.

6. The wallboard of claim 5 wherein said starch comprises uncompletely cooked and unburst starch granules.

7. The wallboard of claim 6 wherein the gypsum plaster is foamed to a density of between 42 to 60 pounds per cubic foot.

8. The cast of claim 1 wherein said fibers are asbestos fibers coated with a starch containing uncompletely burst starch granules.

References Cited
UNITED STATES PATENTS 2,681,863  6/1954  Croce et al. _____ 106—114

JAMES E. POER, Primary Examiner

U.S. Cl. X.R.

161—161, 170, 192